Sept. 13, 1966     R. R. BALAGUER     3,272,655
PRIMARY BATTERY

Filed Feb. 21, 1963     2 Sheets-Sheet 1

United States Patent Office 3,272,655
Patented Sept. 13, 1966

3,272,655
PRIMARY BATTERY
Rodolfo Rodriguez Balaguer, Harbor Beach, Fort Lauderdale, Fla., assignor to J. D. Hedges and Company Limited Partnership, Kingston, Jamaica, British West Indies, a partnership of Cuba
Filed Feb. 21, 1963, Ser. No. 260,270
15 Claims. (Cl. 136—100)

The present invention relates to primary batteries, and particularly to dry cell batteries of the so-called inside out type in which the carbon cathode electrode forms the battery outer shell.

In United States Patent 2,903,499 which issued September 8, 1959 to Rodolfo Rodriguez Balaguer, there is described and claimed a dry cell battery construction in which the cathode electrode (or more properly the "positive electrode") is formed by a carbon cup and a carbon rod projecting from the base of the cup along the longitudinal axis of the cup. The anode electrode is formed by an annular metal sheet disposed between the rod and the cup and which is substantially concentric therewith. The space within the carbon cup, on both the inside and outside of the anode cylinder, is filled, except for the desired air space, with the battery mix material, i.e., the depolarizing agent, electrolyte and any other chemicals which may be mixed therewith. The annular anode is saparated from the battery mix by a bibulous separator, e.g., a paper or starch covering on the anode.

This type of battery construction has been found to be particularly well suited to the so-called magnesium cell in which magnesium is used as the anode metal and the battery mix is selected accordingly to provide the desired electro-chemical system.

It has been recognized that magnesium cells afford a number of advantages which are highly desirable, e.g., a high watt-hour output per battery volume and weight, a long shelf life, good low temperature characteristics and a high operating voltage. But serious problems have been encountered in making practical magnesium batteries which have largely prevented their commercial exploitation. Notable among these problems is that resulting from volumetric expansion of the magnesium anode which occurs as the magnesium metal enters into the chemical reactions with the battery mix. Typically this volumetric expansion will be about 50%. With batteries constructed to provide a maximum of useful power for a particular battery size and operated so as to realize the power output capabilities, the expansion which occurs as the magnesium reacts with the battery mix has been so great that the battery case breaks or ruptures, rendering the cell of no further use. Various expedients have heretofore been tried to overcome the problem of magnesium expansion, but so far as is known no satisfactory solution to the problem has been found heretofore.

The principal object of the present invention has been the provision of a novel and improved dry cell battery.

An important object of the invention has been to provide a novel and improved dry cell battery which is especially adapted for use with a magnesium anode.

Still another object of the invention has been the provision of such a battery which minimizes or overcomes the problems mentioned above.

A further object of the invention has been the provision of a magnesium dry cell battery in which the problem of battery breakage or rupture resulting from magnesium expansion has been eliminated.

Other and further objects, features and advantages of the invention will appear more fully from the following description of the invention taken in connection with the appended drawings, in which.

Figure 1:
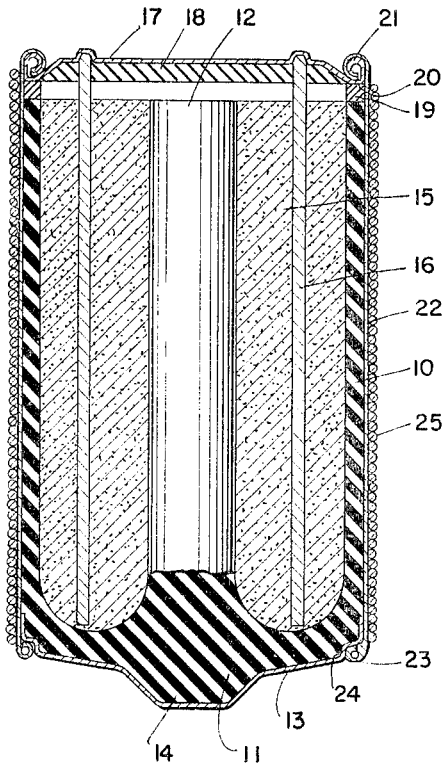
FIG. 1 is a longitudinal sectional view of a battery, similar in basic construction to the type described in the aforementioned Rodriguez Balaguer patent.

Referring now to the drawings and more particularly to FIG. 1, there is shown a battery similar in basic construction to the type of battery disclosed in the aforementioned Rodriguez Balaguer patent. This battery has a cathode structure compressing a cylindrical carbon cup 10, a closed end or base 11 and a central carbon rod 12 projecting upwardly from cup base 11. The cup 10, base 11 and rod 12 are integral, but if desired the rod 12 may be made separately and inserted in a corresponding aperture in base 11. A metal cap 13 having a contact forming boss 14 is provided over base 11.

The cup 10, base 11 and rod 12 may be formed of a molded green carbon, as described in the aforementioned patent. Preferably the molding composition will be formed in accordance with the teachings of Rodriguez Balaguer United States patent application Serial No. 208,096, filed July 6, 1962, now Patent No. 3,196,025.

The annular space between the cup 10 and the central rod 12 is filled with battery mix 15. The space within cup 10 above the free end of rod 12 is usually reserved as an air space into which may flow the liquid exuded upon discharge of the cell. In some cells this air space may be quite small.

A hollow cylindrical anode 16 is inserted into the battery mix with one end being adjacent but spaced from base 11 and the other end projecting beyond the free end of cup 10. A suitable bibulous coating may be provided on anode 16 to prevent direct contact between the anode and the battery mix.

An end cap 17 is soldered to the outer end of anode 16 and form a part of the cell closure and also one of the battery terminals. The inner surface of end cap 17 is preferably covered with an asphalt or similar protective coating 18. The soldering of the anode 16 to end cap 17 and the formation of protective layer 18 are preferably effected in accordance with the teachings of Rodolfo Rodriguez Balaguer United States patent application Serial No. 146,505, filed October 20, 1961, now Patent No. 3,189,487.

A cardboard or similar washer 19 lies on the free end of cup 10 and separates the cup 10 physically and electrically from cap 17. A flat shoulder 20 of cap 17 lies against the opposite surface of washer 19. The outer edge of cap 17 is curved inwardly, as shown at 21, to crimp the adjacent end of a plastic jacket 22 between the edge of cap 17 and shoulder 20. It is desirable that the washer 19 and the crimped end of plastic jacket 22 not afford a complete gas-tight seal so that internal gas pressure may be relieved by gas leakage. The other end of jacket 22 is rolled, as shown at 23, and lies in an annular seat 24 formed in end cap 13. The plastic jacket 22 may be formed from a variety of materials. One example is an extruded acrylic-butadiene-styrene plastic.

An outer reinforcement is provided by wrapping tightly a strong thread 25 in closely spaced turns around the plastic jacket 22. This thread might be, for example, a 0.015″ diameter glass fiber thread or a 0.011″ diameter stainless steel wire. The glass fiber thread may conveniently be of the type sold under the trademark Fiberglas.

The Fiberglas is preferably resin impregnated after being wrapped and may, if desired, be located within the jacket 22 instead of outside the jacket 22.

The anode 16 may be formed from magnesium or a magnesium alloy and typically might be 0.050″–.065″ thick and be rolled into a cylinder having a ⅞″ outside diameter. The foregoing and other dimensions set forth herein are given only by way of illustration and refer to a nominal size "D" cell.

The battery mix 15 may be of any type suited to the anode metal selected. A typical battery mix composition for use with a magnesium anode is the following, percentages being by weight:

88% Type M manganese dioxide (synthetic) Chemical ore 1% Mg (OH)$_2$
3% BaCrO$_4$
8% acetylene black wet 550 ml./1000 g. with 250 g./l. Mg.Br2+
0.25 g./lNa$_2$CrO$_4$ The dry cell battery shown in FIG. 1 may typically correspond substantially to the standard "D" size, and have an outside diameter of about 1.356″. The diameter of rod 12 might be 5/16″ while the thickness of the walls of cup 10 might be 1/16″. The outside diameter of cup 10 might be 1.290″.

Figure 2:
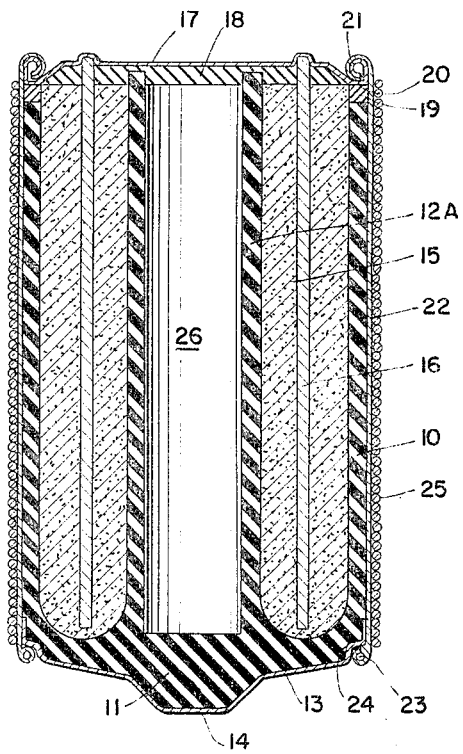
FIG. 2 is a longitudinal sectional view of a battery construction embodying the invention.
Figure 3:
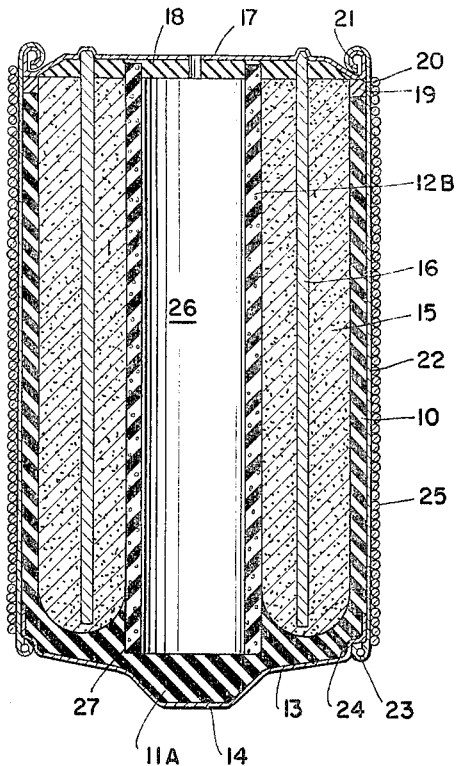
FIG. 3 is a longitudinal sectional view of a modified form of battery construction embodying the invention.

The batteries shown in FIGS. 2 and 3 are similar in construction to the battery shown in FIG. 1 and like parts are designated with like reference numerals. Referring to FIG. 2, the center rod is designated 12A and differs from the rod 12 of FIG. 1 in having a central bore 26 extending from the free end of rod 12A substantially to the level of the base of the annular space between rod 12A and cup wall 10. The length of bore 26 is preferably substantially equal to the length of rod 12A, but may in some cases be slightly less. The bore 26 should not have a length less than a major part of the length of rod 12A. The height of rod 12A is also somewhat greater than that of rod 12 with rod 12A extending into asphalt layer 18. However, the asphalt between the end of rod 12A and end cap 17 affords electrical insulation which prevents short circuiting of the battery. The rod 12A may have the same diameter as rod 12, but as shown the outside diameter of rod 12A is somewhat greater and might be ½″.

The diameter of bore 26 may be about ⅜″ yielding a wall thickness for rod 12A of 1/16″, i.e., the same as that of cup 10.

Referring now to FIG. 3, the center rod, designated 12B, is not integral with the cup base as in FIGS. 1 and 2 but instead is a separate cylinder inserted in a circular recess 27 provided in cup base 11A. The cylinder 12B may have the same dimensions as the rod 12 or the rod 12A or may have different dimensions. As shown, rod 12B has the same dimensions as rod 12A except for a slightly greater length to provide a tight fit and good electrical contact in recess 27.

The cylinder 12B may be made of a green carbon with the same or a different mix as the cup 10, or may be made from a porous baked carbon.

As mentioned previously, when a magnesium battery is put into service, the resulting chemical reactions cause the magnesium anode to expand, actually becoming substantially thicker, because the magnesium oxide which is formed has a greater volume than the metallic magnesium. The exact expansion to be expected at any one time is difficult to calculate because it is affected by various factors. It appears that the oxide formation and hence the expansion is largely controlled by the power output of the cell so that expansion is a more serious problem with light drain-long service applications than in the case of heavy drain-short service applications. Initially the magnesium expansion is accommodated by compression of the battery mix and, to a limited extent, by movement of the battery mix into the air space, if such space be provided. Such a space is provided in FIG. 1 but not in FIGS. 2 and 3. After the initial period the expansion is observable as a swelling of the cell, i.e., an increase in outside diameter which, if it continues, results in a breakage or rupture of the cell outer wall.

Figure 4:
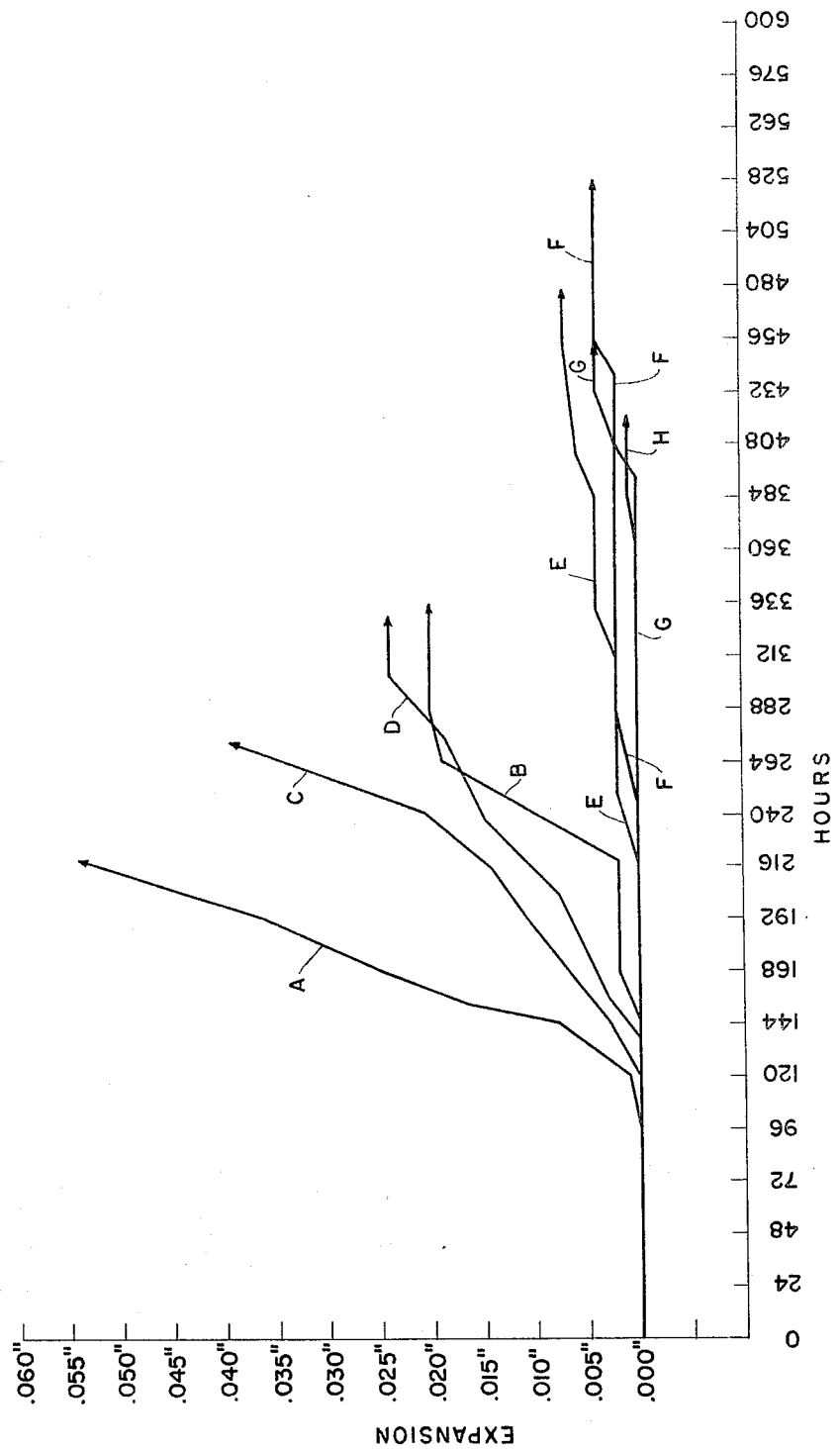
FIG. 4 is a set of curves illustrating the expansion characteristics of various types of battery constructions.

In FIG. 4 there are set forth curves showing expansion, i.e., increase in cell outside diameter, for 8 different "D" size magnesium batteries subjected to an 83⅓ ohm continuous test at 21° C. This is joint Army-Navy test JAN–BA–8 (7 October, 1947). In these curves expansion of outside diameter is plotted in inches against time in hours. In each case the end of the curve is determined by the battery output voltage falling to the nominal cut off value 1.13 volts.

Curve A is for a conventional construction with a magnesium can anode and a central carbon rod cathode, essentially a conventional Leclanche type cell similar to those described in the article by R. C. Kirk and A. B. Fry entitled Magnesium Dry Cells in volume 94, pages 277–289 of the Journal of the Electrochemical Society (December, 1948). The cell had an open circuit voltage of 1.8 volts and a short circuit current of 1.6 amperes. The expansion (increase in diameter) after about 220 hours resulted in such severe distortion that the expansion could not conveniently be measured beyond the value of about 0.054″ at 220 hours although cut off voltage was not reached until about 264 hours. The expansion of this cell resulted in a badly cracked and distorted case and consequent drying out of the battery.

Curve B is for a cell similar to that of curve A but encased in a heavy steel jacket. This cell had an open circuit voltage of 1.8 volts and a short circuit current of 2 amperes. Cut off voltage was reached at 198 hours, the total expansion then being .002″. Continuing the discharge to 0.56 volt at 288 hours resulted in an expansion of .020″. The magnesium can and the steel jacket were both cracked.

Curve C is for a cell constructed in accordance with FIG. 1 but without the Fiberglas wrapping 25, i.e., the carbon cup 10 was restrained against expansion only by a .015″ thick Cycolac plastic jacket. The center rod was solid and 5/16″ in diameter. The wall thickness of cup 10 was 1/16″ and the cup outside diameter initially was 1.290″. The cell open circuit voltage was 1.92 v. and the short circuit current was 12 a. Cut off voltage was reached at about 420 hours but due to distortion expansion could not conveniently be measured beyond the value of .039″ at 275 hours. The carbon cup was badly cracked.

Curve D is for a cell similar to that of FIG. 2 with a ½″ diameter center rod having a ⅜″ hole 26 drilled therein. However, instead of Fiberglas, the wrapping 25 was made from 0.010″ diameter nylon thread coated (after wrapping) with a spar varnish. This cell had an open circuit voltage of 1.94 volts and a short circuit current of 22 amperes. Cut off voltage was reached at about 331 hours with an expansion of about 0.024″ which resulted in cracking of the carbon cup.

Curve E is for a cell construction of the FIG. 1 type essentially the same as in the case of curve C except that in curve E the cell had a wrapping 25 of about 40 feet of 0.015″ thick Fiberglas thread impregnated, after wrapping, with a conventional Fiberglas resin. The cell cut off voltage was reached at about 480 hours with an expansion of about 0.007″. This expansion did not result in a cracking of the carbon cup.

Curve F is for a cell construction of the FIG. 2 type essentially the same as in the case of curve D except that instead of a nylon wrapping the cell was provided with a wrapping 25 of approximately 50′ of 0.011″ diameter stainless steel wire having a breaking strength of about 27 pounds. The steel wire, after wrapping, was coated with spar varnish. The open circuit voltage of this cell was 1.96 volts and the short circuit current was 18 amperes. The cut off voltage was reached at 456 hours with a total expansion of 0.004". The carbon cup was not cracked.

Curve G is for a cell construction of the FIG. 2 type essentially the same as in the case of curves D and F except that the wrapping 25 was made with approximately 40 feet of .015" diameter Fiberglas thread coated, after wrapping, with resin. The open circuit voltage was 1.96 volts and the short circuit current was 17 amperes. Cut off voltage was reached at 528 hours with a total expansion of 0.004". The carbon cup was not cracked. The internal diameter of the central rod decreased during the test between about 1/32 and 1/64 inch.

Curve H is for a cell constructed substantially as shown in FIG. 3 with a baked carbon center rod 1/2" in outside diameter and 3/8" in inside diameter. The wrapping 25 was with approximately 40 feet of 0.015" Fiberglas thread. Cut off voltage was reached at about 419 hours with a total expansion of 0.001". The carbon cup was not cracked.

In accordance with the invention, the expansion stresses encountered during battery discharge are accommodated internally or at least largely internally so that the external expansion of the cell will not be sufficient to rupture or crack the carbon cup with the consequent drying out and destruction of the battery. The internal expansion accommodation occurs by a squeezing of the central carbon rod. It is not clear whether this squeezing results in an increase in the density of the central rod material or a simpler physical compression of the rod structure or a combination of these factors.

In any event, the hollow central rod contracts so that the expansion stresses are relieved internally. Since these stresses necessarily also are exerted on the outside cup wall it is necessary that this wall be strengthened to resist these stresses while contraction of the central rod occurs. It has been found that tightly wrapped steel wire or Fiberglas thread, as described above, will afford the necessary reinforcement. The more stretchable fibers such as nylon do not appear to be satisfactory for this purpose, although if applied under sufficient initial tension they might be satisfactory. A steel can or jacket could be used for reinforcement provided the problem of affording a tight fit between the carbon cup and steel jacket can be overcome despite manufacturing tolerances. For example, the carbon cup could be molded within the steel jacket.

Expansion stresses can also be relieved internally with either a hollow or solid center rod by molding the center rod (or center rod and cup) from a mix which will yield a readily compressible member. For example, a few percent of asphalt may be included in the carbon mix as a part of the binder and will result in a more easily compressible rod.

While the invention has been described in connection with specific embodiments thereof and in specific uses, various modifications thereof will occur to those skilled in the art without departing from the spirit and scope of the invention as set forth in the appended claims.

What is claimed is:

1. A dry cell battery, comprising a carbon cup having a hollow body, a closed end and an open end, a carbon rod projecting from said closed end and disposed generally along the longitudinal axis of said cup and being electrically connected thereto, said cup and said rod forming a cathode structure, a hollow annular metallic anode disposed between said rod and said cap and being substantially concentric therewith, said anode being formed from a metal which increases substantially in volume as a result of the chemical reaction occurring during the discharge of said battery, closure means for said open end of said cup, battery mix contained in the space between said anode and said cup and said rod to react chemically with said anode when said anode and said cathode structure are electrically connected through an external circuit, said chemical reaction producing a substantially increase in the volume of material within said cell thereby producing a transverse stress tending to rupture said cup, and reinforcing means surrounding said body of said cup and arranged to resist the rupturing force exerted on said body upon said increase in volume of said material within said cell, said carbon rod being hollow throughout at least a major portion of the height thereof whereby said transverse stress is substantially accommodated by a contraction in the cross sectional area of said rod.

2. A dry cell battery, comprising a carbon cup having a hollow cylindrical body, a closed end and an open end, a carbon rod projecting from said closed end and disposed generally along the longitudinal axis of said cup and being electrically connected thereto, said cup and said rod forming a cathode structure, an annular metallic anode disposed between said rod and said cup and being substantially concentric therewith, said anode being formed from a metal which increases substantially in volume as a result of the chemical reaction occurring during the discharge of said battery, closure means for said open end of said cup, battery mix contained in the annular space between said anode and said cup and said rod to react chemically with said anode when said anode and said cathode structure are electrically connected through an external circuit, said chemical reaction producing a substantial increase in the volume of material within said cell thereby producing a transverse stress tending to rupture said cup, and reinforcing means surrounding said body of said cup and arranged to resist the rupturing force exerted on said body upon said increase in volume of said material within said cell, said carbon rod being hollow throughout substantially the entire height thereof whereby said transverse stress is substantially accommodated by a contraction in the cross sectional area of said rod.

3. A dry cell battery, comprising a molded green carbon cup having a hollow cylindrical body, a closed end and an open end, a carbon rod projecting from said closed end and disposed generally along the longitudinal axis of said cup and being electrically connected thereto, said cup and said rod forming a cathode structure, an annular magnesium anode disposed between said rod and said cup and being substantially concentric therewith, closure means for said open end of said cup including an electrical contact element electrically connected to said anode, battery mix contained in and substantially filling the annular space between said anode and said cup and said rod to react chemically with said anode when said anode and said cathode structure are electrically connected through an external circuit, said chemical reaction producing a substantial increase in the volume of material within said cell thereby producing a transverse stress tending to rupture said cup, and reinforcing means surrounding said body of said cup and arranged to resist the rupturing force exerted on said body upon said increase in volume of said material within said cell, said carbon rod being hollow throughout substantially the entire height thereof whereby said transverse stress is accommodated by a contraction in the cross sectional area of said rod.

4. A dry cell battery, comprising a molded green carbon cup having a hollow cylindrical body, a closed end and an open end, a carbon rod integral with and projecting from said closed end along the longitudinal axis of said cup, said cup and said rod forming a cathode structure, an annular magnesium anode disposed between said rod and said cup and being substantially concentric therewith, closure means for said open end of said cup including an electrical contact element electrically connected to said anode, battery mix contained in and substantially filling the annular space between said anode and said cup and said rod to react chemically with said anode when said anode and said cathode structure are electrically connected through an external circuit, said chemical reaction producing a substantial increase in the volume of material within said cell thereby producing a transverse stress tending to rupture said cup, and reinforcing means surrounding said body of said cup and arranged to resist the rupturing force exerted on said body upon said increase in volume of said material within said cell, said carbon rod being hollow throughout substantially the entire height thereof whereby said transverse stress is accommodated by a contraction in the cross sectional area of said rod.

5. A dry cell battery, comprising a molded green carbon cup having a hollow cylindrical body, a closed end and an open end, said closed end having a socket formation facing said open end, a carbon rod having one end thereof inserted in and retained by said socket formation, said rod being disposed generally along the longitudinal axis of said cup and being electrically connected thereto, said cup and said rod forming a cathode structure, an annular magnesium anode disposed between said rod and said cup and being substantially concentric therewith, closure means for said open end of said cup including an electrical contact element electrically connected to said anode, battery mix contained in and substantially filling the annular space between said anode and said cup and said rod to react chemically with said anode when said anode and said cathode structure are electrically connected through an external circuit, said chemical reaction producing a substantial increase in the volume of material within said cell thereby producing a transverse stress tending to rupture said cup, and reinforcing means surrounding said body of said cup and arranged to resist the rupturing force exerted on said body upon said increase in volume of said material within said cell, said carbon rod being hollow throughout substantially the entire height thereof whereby said transverse stress is accommodated by a contraction in the cross sectional area of said rod.

6. A dry cell battery as set forth in claim 5 in which said rod is formed of a baked carbon.

7. A dry cell battery as set forth in claim 3 in which the wall thickness of said carbon rod is substantially equal to the wall thickness of said cup.

8. A dry cell battery, comprising a carbon cup having a hollow cylindrical body, a closed end and an open end, a carbon rod projecting from said closed end and disposed generally along the longitudinal axis of said cup and being electrically connected thereto, said cup and said rod forming a cathode structure, an annular magnesium anode disposed between said rod and said cup and being substantially concentric therewith, closure means for said open end of said cup including an electrical contact element electrically connected to said anode, battery mix contained in and substantially filling the annular space between said anode and said cup and said rod to react chemically with said anode when said anode and said cathode structure are electrically connected through an external circuit, said chemical reaction producing a substantial increase in the volume of material within said cell thereby producing a transverse stress tending to rupture said cup, and reinforcing means surrounding said body of said cup and arranged to resist the rupturing force exerted on said body upon said increase in volume of said material within said cell, said reinforcing means comprising a series of closely spaced turns of a substantially inelastic thread, said carbon rod being hollow throughout at least a major portion of the height thereof whereby said transverse stress is accommodated by a contraction in the cross sectional area of said rod.

9. A dry cell battery as set forth in claim 8 in which said thread is formed from glass fibers.

10. A dry cell battery as set forth in claim 8 in which said thread is formed from steel wire.

11. A dry cell battery, comprising a hollow cup having a hollow cylindrical body, a closed end an an open end and forming one of the electrodes of said battery, an elongated tubular electrically conductive member located within said cup and forming another electrode of said battery, said electrically conductive member being located so that all points on the outer surface thereof are substantially equidistant from the adjacent points of said cup, one of said electrodes being made from a metal which increases substantially in volume as a result of the chemical reactions occurring during the discharge of said battery, battery mix located within said battery and arranged to react chemically with one of said electrodes when said electrodes are electrically connected together through an external circuit, said chemical reaction producing a substantial increase in the volume of material within said cell thereby producing a transverse stress tending to rupture said cup, reinforcing means surrounding said body of said cup and arranged to resist the rupturing force exerted on said body upon said increase in volume of said material within said cell, and compressible means located within said cup and extending longitudinally of said cup, said compressible means being compressed upon said increase in volume of said material in said cell whereby said transverse stress is accommodated by a contraction of said compressible means.

12. A dry cell battery, comprising a hollow carbon cup having a hollow cylindrical body, a closed end and an open end and forming one of the electrodes of said battery, a hollow magnesium anode located within said cup and being substantially concentric therewith and forming another electrode of said battery, battery mix located within said battery and arranged to react chemically with said anode electrode when said electrodes are electrically connected together through an external circuit, said chemical reaction producing a substantial increase in the volume of material within said cell thereby producing a transverse stress tending to rupture said cup, reinforcing means surrounding said body of said cup and arranged to resist the rupturing force exerted on said body upon said increase in volume of said material within said cell, said reinforcing means comprising a series of closely spaced turns of substantially inelastic thread, and compressible means located within said cup and extending longitudinally of said cup, said compressible means being compressed upon said increase in volume of said material in said cell whereby said transverse stress is accommodated by a contraction of said compressible means.

13. A dry cell battery, comprising a molded green carbon cup having a hollow cylindrical body, a closed end and an open end, a carbon rod projecting from said closed end and disposed generally along the longitudinal axis of said cup and being electrically connected thereto, said cup and said rod forming a cathode structure, an annular magnesium anode disposed between said rod and said cup and being substantially concentric therewith, closure means for said open end of said cup including an electrical contact element electrically connected to said anode, battery mix contained in the annular space between said anode and said cup and said rod to react chemically with said anode when said anode and said cathode structure are electrically connected through an external circuit, said chemical reaction producing a substantial increase in the volume of material within said cell thereby producing a transverse stress tending to rupture said cup, and reinforcing means comprising a series of closely spaced turns of a substantially inelastic thread selected from the group consisting of glass fibers and steel wire and surrounding said body of said cup and arranged to resist the rupturing force exerted on said body upon said increase in volume of said material within said cell.

14. A dry cell battery as set forth in claim 13 in which said thread is formed from glass fibers resin-impregnated after being wrapped about said body.

15. A dry cell battery, comprising a molded green carbon cup having a hollow cylindrical body, a closed end and an open end, a carbon rod projecting from said closed end and disposed generally along the longitudinal axis of said cup and being electrically connected thereto, said cup and said rod forming a cathode structure, an annular magnesium anode disposed between said rod and said cup and being substantially concentric therewith, closure means for said open end of said cup including an electrical contact element electrically connected to said anode, a sealing and electrically insulating annular washer disposed between said open end of said cup and said contact element, an axially extensible jacket surrounding said body of said cup and retaining said cup and said contact element in assembled relationship, battery mix contained in the annular space between said anode and said cup and said rod to react chemically with said anode when said anode and said cathode structure are electrically connected through an external circuit, said chemical reaction producing a substantial increase in the volume of material within said cell thereby producing a transverse stress tending to rupture said cup, and reinforcing means comprising a series of turns of tightly-wrapped substantially inelastic thread surrounding said body of said cup and arranged to resist the rupturing force exerted on said body upon said increase in volume of said material within said cell, said increase in volume of said material within said cell also producing an elongation of said cell in an axial direction, said thread being selected from the group consisting of glass fibers and steel wire.

References Cited by the Examiner

UNITED STATES PATENTS

| | | | |
|---|---|---|---|
| 1,471,486 | 10/1923 | Jewett | 136—123 |
| 2,480,839 | 9/1949 | Daniel | 136—107 |
| 2,580,664 | 1/1952 | Drummond | 136—133 |
| 2,903,499 | 9/1959 | Balaguer | 136—107 |

ALLEN B. CURTIS, *Primary Examiner.*

MURRAY TILLMAN, WINSTON A. DOUGLAS,
*Examiners.*

UNITED STATES PATENT OFFICE

CERTIFICATE OF CORRECTION

Patent No. 3,272,655　　　　　　　　　　　September 13, 1966

Rodolfo Rodriguez Balaguer

It is hereby certified that error appears in the above numbered patent requiring correction and that the said Letters Patent should read as corrected below.

Column 1, line 28, for "saparated" read -- separated --; column 2, line 43, for "form" read -- forms --; column 5, line 65, for "cap" read -- cup --; line 74, for "substantialy" read -- substantial --; column 7, line 69, for "an", first occurrence, read -- and --.

Signed and sealed this 1st day of August 1967.

(SEAL)
Attest:

EDWARD M. FLETCHER, JR.
Attesting Officer

EDWARD J. BRENNER
Commissioner of Patents